United States Patent
Smith et al.

(10) Patent No.: US 11,589,353 B2
(45) Date of Patent: Feb. 21, 2023

(54) REAL-TIME DYNAMIC BANDWIDTH EXPANSION

(71) Applicant: Cisco Technology, Inc., San Jose, CA (US)

(72) Inventors: Malcolm M. Smith, Richardson, TX (US); Venkataprasad Chirreddy, Milpitas, CA (US); Guru Prasanna Gopalakrishnan, San Jose, CA (US); James F. Florwick, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 224 days.

(21) Appl. No.: 17/009,672

(22) Filed: Sep. 1, 2020

(65) Prior Publication Data

US 2022/0070861 A1   Mar. 3, 2022

(51) Int. Cl.
*H04L 12/28* (2006.01)
*H04W 72/0453* (2023.01)
*H04W 72/08* (2009.01)
*H04J 1/16* (2006.01)
*H04W 84/12* (2009.01)

(52) U.S. Cl.
CPC ..... *H04W 72/0453* (2013.01); *H04W 72/085* (2013.01); *H04W 84/12* (2013.01)

(58) Field of Classification Search
CPC .... H04B 7/0632; H04B 17/24; H04B 17/309; H04L 5/0041; H04L 5/0057; H04W 24/10; H04W 72/0453; H04W 16/10; H04W 24/08

USPC ......................................... 370/252, 329, 430
See application file for complete search history.

(56) References Cited

U.S. PATENT DOCUMENTS

| | | |
|---|---|---|
| 8,363,578 B1 | 1/2013 | Ramamurthy et al. |
| 8,462,709 B2 | 6/2013 | Nanda et al. |
| 8,971,273 B2 | 3/2015 | Chan et al. |
| 8,989,068 B1 | 3/2015 | Ramamurthy et al. |
| 10,972,943 B2 | 4/2021 | Kulkarni et al. |
| 2013/0039200 A1 | 2/2013 | Park et al. |
| 2015/0264699 A1 | 9/2015 | Fwu et al. |
| 2016/0066202 A1* | 3/2016 | Dayan ............. H04W 24/02 370/252 |
| 2017/0006479 A1 | 1/2017 | Smith et al. |
| 2017/0134119 A1 | 5/2017 | Li et al. |

(Continued)

OTHER PUBLICATIONS

Kulkarni et al., "Radiofrequency Trends Aware Dynamic Band Width Selection," Defensive Publications Series, Jan. 30, 2019, 4 pages.

(Continued)

*Primary Examiner* — John Pezzlo
(74) *Attorney, Agent, or Firm* — Patterson + Sherdan, LLP (57) ABSTRACT

Techniques for dynamic bandwidth expansion are provided. A first set of channel quality metrics is collected, by an access point (AP) communicating using a first bandwidth, for an expanded bandwidth beyond the first bandwidth. A second set of channel quality metrics for the expanded bandwidth is received from one or more stations. An available portion of the expanded bandwidth is then determined based on the first and second sets of channel quality metrics. Communication with the one or more stations is initiated using the available portion of the expanded bandwidth.

20 Claims, 6 Drawing Sheets

(56) References Cited

U.S. PATENT DOCUMENTS

| | | |
|---|---|---|
| 2017/0295578 A1 | 10/2017 | Khoshnevisan et al. |
| 2017/0303276 A1* | 10/2017 | Cheng .................. H04L 5/0094 |
| 2018/0270821 A1 | 9/2018 | Griesdorf et al. |
| 2019/0349055 A1* | 11/2019 | Bhattad ............. H04W 72/0453 |
| 2021/0344399 A1* | 11/2021 | Levy .................... H04L 5/0073 |

OTHER PUBLICATIONS

PCT, Notification of Transmittal of The International Search Report and The Written Opinon of The International Searching Authority, or The Declaration for Application PCT/US2021/071311 dated Dec. 8, 2021.

* cited by examiner

REAL-TIME DYNAMIC BANDWIDTH EXPANSION

TECHNICAL FIELD

Embodiments presented in this disclosure generally relate to wireless connectivity. More specifically, embodiments disclosed herein relate to dynamic wireless bandwidth for improved throughput.

BACKGROUND

Wireless networks can be deployed in various environments to provide connectivity to a wide variety devices. In many deployments, the capabilities and functionality of each connected device can differ substantially. For example, many devices are limited in the bandwidth or rate of communication they can support. Generally, larger bandwidth enables higher rates of communication. However, larger bandwidths are also more likely to interfere with neighboring channels (or receive interference from neighboring channels). Thus, deployments are configured to find a balance between large bandwidth and reduced interference. Some systems can make bandwidth decisions dynamically, but these decisions are not performed in real-time and require significant wireless stability to be useful.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method. The method comprises: collecting, by an access point (AP) communicating using a first bandwidth, a first set of channel quality metrics for an expanded bandwidth beyond the first bandwidth; receiving, from one or more stations, a second set of channel quality metrics for the expanded bandwidth; determining, based on the first and second sets of channel quality metrics, an available portion of the expanded bandwidth; and initiating communication with the one or more stations using the available portion of the expanded bandwidth.

Another embodiment presented in this disclosure provides a non-transitory computer-readable medium containing computer program code that, when executed by operation of one or more computer processors, performs an operation. The operation comprises: collecting, by an access point (AP) communicating using a first bandwidth, a first set of channel quality metrics for an expanded bandwidth beyond the first bandwidth; receiving, from one or more stations, a second set of channel quality metrics for the expanded bandwidth; determining, based on the first and second sets of channel quality metrics, an available portion of the expanded bandwidth; and initiating communication with the one or more stations using the available portion of the expanded bandwidth.

Another embodiment presented in this disclosure provides a system comprising: one or more computer processors; and a memory containing a program which when executed by the one or more computer processors performs an operation. The operation comprises: collecting, by an access point (AP) communicating using a first bandwidth, a first set of channel quality metrics for an expanded bandwidth beyond the first bandwidth; receiving, from one or more stations, a second set of channel quality metrics for the expanded bandwidth; determining, based on the first and second sets of channel quality metrics, an available portion of the expanded bandwidth; and initiating communication with the one or more stations using the available portion of the expanded bandwidth.

EXAMPLE EMBODIMENTS

Embodiments of the present disclosure provide techniques to dynamically expand bandwidth when possible, while avoiding channel contention and interference. In some deployments, radio resource management components determine an appropriate bandwidth based on long-term channel stability (e.g., with the goal of little or no interference over minutes or hours). However, quality metrics for wireless channels change frequently due to a wide variety of external factors. Thus, such deployments typically opt for relatively limited bandwidth selections in order to ensure that changing conditions do not cause interference. Embodiments of the present disclosure utilize near real-time evaluation of channel quality and provide rapid expansion of used bandwidth to exploit temporal channel stability. This allows for bursts of data to be transmitted at higher bandwidths, while the expanded channel remains clear.

In one embodiment, as stations associate with each access point (AP), they indicate the maximum bandwidth they support. While communicating using the initial advertised bandwidth, the AP can begin probing adjacent channels to identify expanded portions of the wireless spectrum that are clear. In an embodiment, if such bandwidth appears to be available, the AP can query the stations capable of supporting the expanded bandwidth, requesting that they provide channel metrics relating to how clear the expanded channel is from their side. In some embodiments, based on these metrics, the AP can initiate communications using the expanded bandwidth with the stations that are available and capable of doing so. This temporal expansion may last some predefined period of time (e.g., as determined by the AP based on the channel metrics), or until the channel degrades beyond a predefined point.

Figure 1:
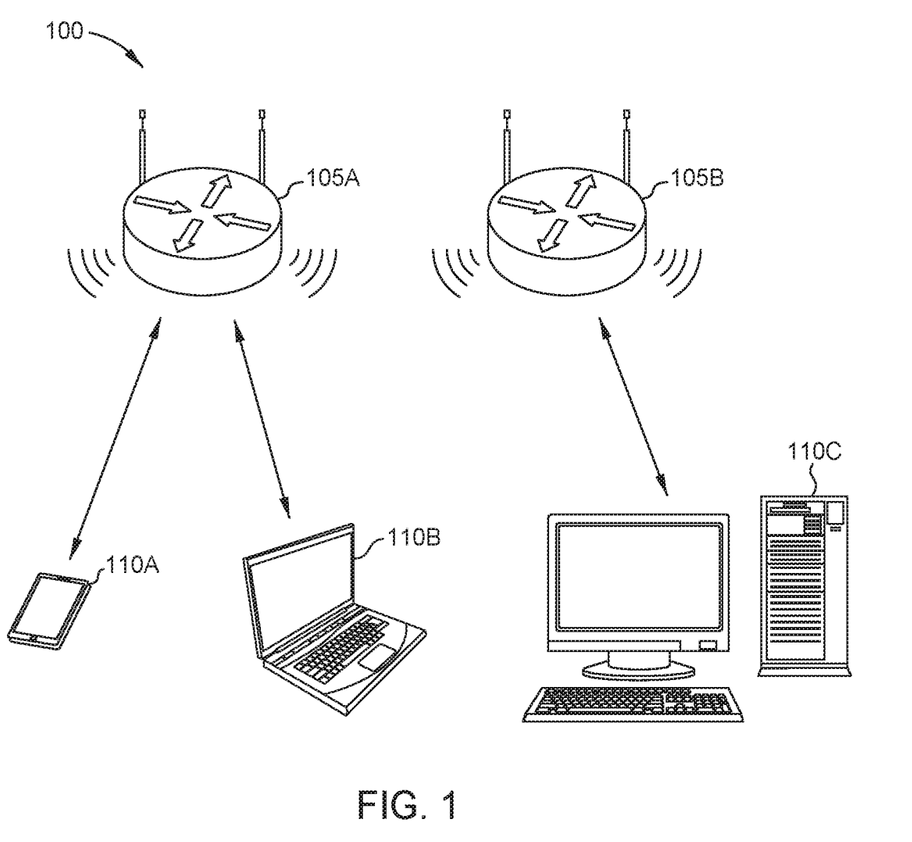
FIG. 1 illustrates a system configured to provide dynamic bandwidth expansion, according to some embodiments disclosed herein.

FIG. 1 illustrates a system 100 configured to provide dynamic bandwidth expansion, according to some embodiments disclosed herein. In the illustrated system 100, two APs 105A and 105B are deployed to provide wireless connectivity to Stations 110A-C. Although two APs 105 are depicted, in embodiments, there may of course be any number of APs in the deployment. Similarly, although three Stations 110A-C are depicted in the illustrated embodiment, there may of course be any number of Stations 110 at any given time. In embodiments, the APs 105 provide a wireless local area network (WLAN). For example, in one embodiment, the WLAN is a Wi-Fi network.

In the illustrated embodiment, the Stations 110A and 110B are associated to the AP 105A, and the Station 110C is associated to the AP 105B. In some embodiments, each Station 110 may generally associate and disassociate with the APs 105, as well as migrate between APs 105, as desired. In an embodiment, each AP 105 advertises the bandwidth it uses for communications. This may be referred to, in some embodiments, as the "base" bandwidth or "original" bandwidth.

In one embodiment, when a Station 110 initially associates with an AP 105, the Station 110 transmits an indication of the bandwidth it can support. For example, although the AP 105 may advertise a base bandwidth of 40 megahertz, a Station 110 may be capable of supporting up to 160 megahertz communications. The difference between the maximum-supported bandwidth indicated by the Station 110 and the currently-advertised (referred to in some embodiments as the base bandwidth) bandwidth indicated by the AP 105 represents potential expanded bandwidth for communications with the Station 110. In some embodiments, in addition to indicating their maximum-supported bandwidth, a Station 110 may also indicate whether it supports dynamic bandwidth expansion.

In embodiments, each AP 105 may periodically scan the currently-used channel and/or adjacent channels to determine the quality and clarity of each. In one embodiment, the AP 105 scans and collects metrics relating to signal-to-noise ratio, the noise floor, and the like to determine the quality of its channel and/or adjacent channels. In at least one embodiment, the AP 105 can utilize a neighbor discovery protocol to identify other nearby APs 105, and request similar scan reports from each. This allows the AP 105 to build an understanding of the quality of its own channel as well as adjacent channels. In some embodiments, in addition to determining instantaneous channel quality, the AP 105 can track the quality over time to determine how long each portion of the wireless spectrum remains clear (e.g., how long the channel quality is sufficient for quality communications).

In some embodiments, the quality metrics determined by the AP 105 may not cover the channel quality of the entire space. For example, the APs 105 may be located in one location (e.g., on the ceiling of a room) while Stations 110 tend to occupy other locations (e.g., on or near the floor). Thus, while the channel(s) may appear clear from the perspective of the AP 105, channel contention or interference may be a more serious concern to one or more Stations 110. In one embodiment, therefore, the AP 105 can query one or more Stations 110 regarding the channel metrics from their perspective. These metrics can include, for example, the noise floor of one or more channels, the signal-to-noise ratio, and the like.

In at least one embodiment, the AP 105 only queries Stations 110 that indicate they are capable of supporting the expanded bandwidth. For example, if the AP 105 determines that some portion of expanded bandwidth may be available, the AP 105 may identify the set of Stations 110 that are capable of supporting at least that expanded bandwidth. The AP 105 may then request channel metrics from this subset of stations.

By utilizing its own metrics and the metrics returned by Stations 110, the AP 105 can determine whether expanded bandwidth is available, as well as a time the expanded channel is expected to remain clear. In embodiments, the AP 105 may transmit a trigger frame to each Station 110 that will participate in the expanded bandwidth communication. In an embodiment, there may be any number of Stations 110 involved in the expanded bandwidth interaction. This trigger may include, for example, the bandwidth that is to be used, the time the expanded bandwidth is to be used for, and the like.

In embodiments, the AP 105 may initiate expanded communication with all of the previously-identified Stations 110 that support the expanded bandwidth, and/or some subset thereof. For example, the AP 105 may only initiate expanded bandwidth for the Stations 110 that reported clear channel metrics, from their perspective. In some embodiments, the AP 105 may be able to support a maximum number of stations at the expanded bandwidth. In embodiments, the AP 105 may utilize any number of criteria to select among the capable Stations 110 if limited capacity exists. For example, the AP 105 may consider predefined station and/or user priorities.

In an embodiment, once a participating Station 110 confirms the expanded bandwidth, it begins communicating with the AP 105 at the expanded bandwidth. This can significantly increase throughput of the network, allowing for rapid burst communications. In various embodiments, this expanded communication may continue until one or more predefined terminating criteria are satisfied.

For example, in one embodiment, the AP 105 and Station 110 revert to the base bandwidth upon expiration of the determined clear time. In some embodiments, the AP 105 and/or Station 110 can monitor the channel during the burst communication, and cancel the expanded bandwidth if the channel quality degrades beyond a predefined threshold.

Figure 2:
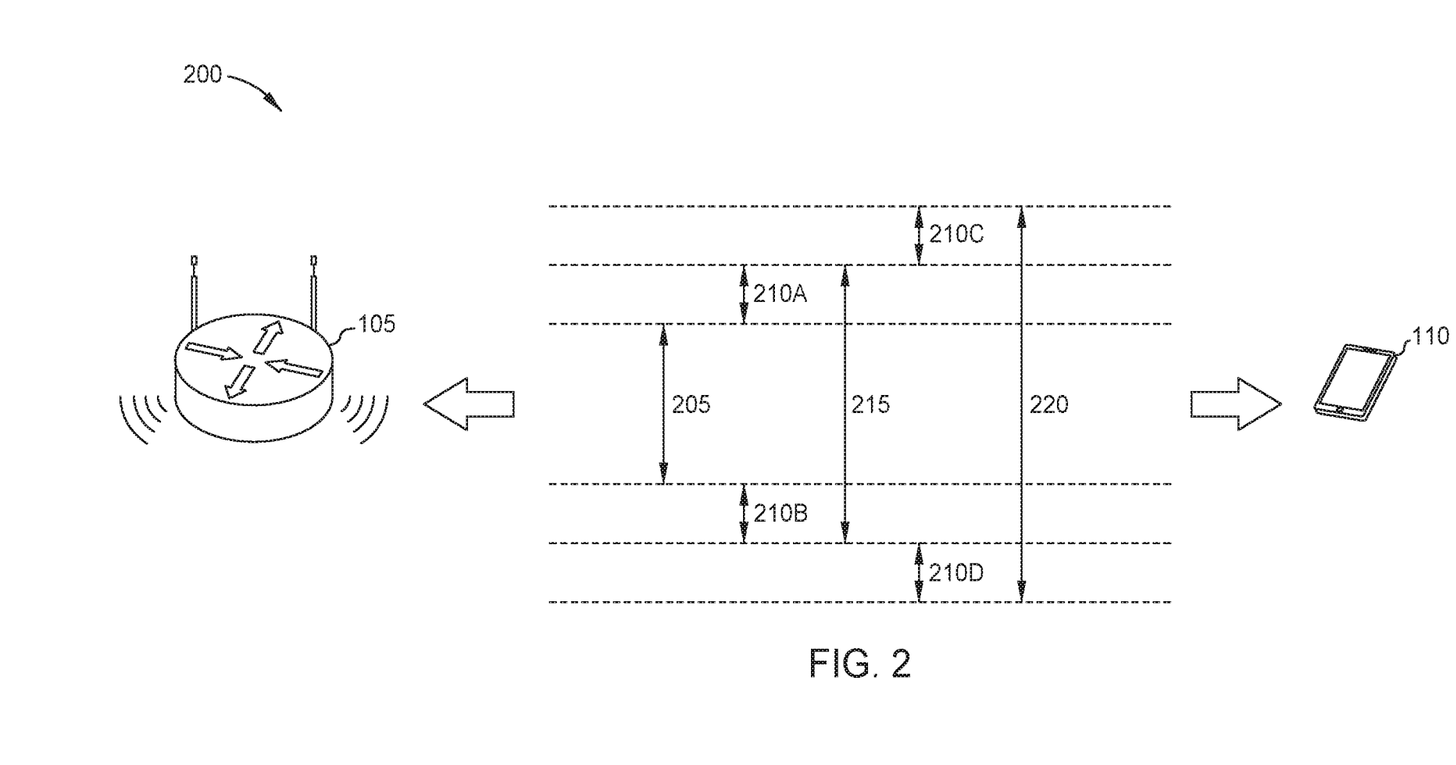
FIG. 2 depicts an access point and a station configured to communicate using dynamic bandwidth expansions, according to some embodiments disclosed herein.

FIG. 2 depicts an Access Point 105 and a Station 110 configured to communicate using dynamic bandwidth expansions, according to some embodiments disclosed herein. In the illustrated embodiment, the AP 105 and Station 110 are initially communicating using a Base Bandwidth 205. This may correspond to the bandwidth advertised by the AP 105, and used by each Station 110 that connects. In the illustrated embodiment, there are several portions of Expanded Bandwidth 210A-D adjacent to the Base Bandwidth 205.

In some embodiments, this Adjacent Bandwidth 210 may be utilized by other APs 105, or may be unused due to interference or spillover from the used Base Bandwidth 205. In embodiments, the AP 105 and/or Station 110 can probe these Adjacent Bandwidths 210 periodically or upon request, in order to determine the quality of each channel (e.g., based on the air quality index (AQI) of each). If the quality index exceeds predefined criteria for one or more portions of the Expanded Bandwidth 210, the AP 105 may determine that it can use this Expanded Bandwidth 210 to communicate with the Station 110.

For example, suppose the Expanded Bandwidth 210A and 210B is determined to be clear for communications at the moment (e.g., over the last ten seconds). In an embodiment, the AP 105 may initiate communications using the Base Bandwidth 205 and the Expanded Bandwidths 210A-B, resulting in an overall Bandwidth 215 that is expanded beyond the base bandwidth. This enables significantly-higher throughput. Similarly, if the Expanded Bandwidth 210C and 210D are also available, the AP 105 and Station 110 may utilize the Bandwidth 220.

In embodiments, any number of adjacent channels or portions of the wireless spectrum may be utilized. In some embodiments, the AP 105 can record the wireless metrics over time in order to better respond to future conditions. In one such embodiment, to predict how long the adjacent space is likely to remain free, the AP 105 may consider not only the current and immediately-prior conditions (e.g., within the last ten seconds) but also historical records (e.g., from days, weeks, months, or years prior). In this way, the AP 105 may learn and identify patterns in the metrics, and predict the current clearance based on these patterns. For example, the AP 105 may learn that the expanded bandwidth tends to remain open for longer periods during certain times of day, days of the week, and the like.

In a related embodiment, the AP 105 may learn to predict or estimate the client-side conditions (provided by the Stations 110) based on the conditions at the AP 105. For example, the AP 105 may identify prior data when the statistics, as viewed from the AP 105, were similar to the current metrics. In one embodiment, the AP 105 may then estimate or predict that the current metrics for each Station 110 are similar to the prior-provided metrics from the stations. In this way, in some embodiments, the AP 105 may refrain from requesting data from the Stations 110 when it can make its own predictions.

In at least one embodiment, the AP 105 can utilize machine learning to predict the clearance time and/or quality metrics from the perspective of the Station 110. For example, using prior records, the AP 105 (or one or more other components or devices) may train a machine learning model to predict the metrics, as viewed by a Station 110, when provided AP-level metrics. To do so, in one embodiment, the prior AP metrics may be provided as input, and the prior station metrics can be used as target output to compute errors and refine the model.

In a related embodiment, the AP 105 may utilize machine learning to predict how long the expanded bandwidth will be available. To do so, the system may determine how long the expanded channel remained clear and usable during previous sessions. This time may then be used as target output for a machine learning model, given the prior quality metrics as input. This trains the model to predict a clear time based on current quality metrics.

In some embodiments, by learning and iteratively pushing further (e.g., using larger expanded bandwidths and/or using the expanded space for longer periods of time), the AP 105 can adaptively provide dynamic bandwidth expansion for the deployment.

Figure 3:
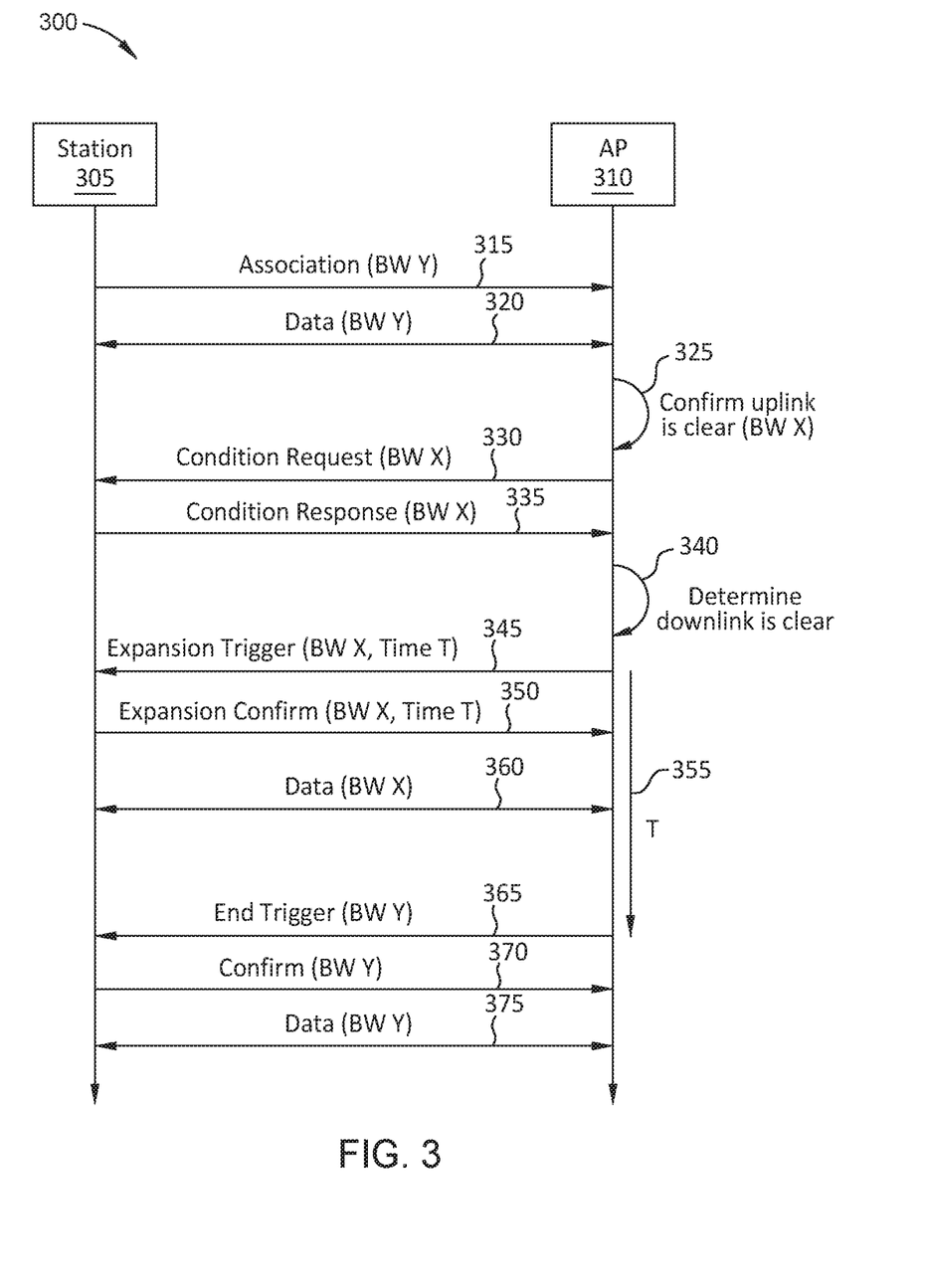
FIG. 3 illustrates a workflow for initiating and utilizing dynamic bandwidth expansion, according to some embodiments disclosed herein.

FIG. 3 illustrates a workflow 300 for initiating and utilizing dynamic bandwidth expansion, according to some embodiments disclosed herein. In the illustrated embodiment, a Station 305 and AP 310 interact to identify and provide expanded bandwidth communications.

The workflow 300 begins when the Station 305 associates with the AP 310, as indicated by arrow 315. As illustrated, this association uses bandwidth (BW) "Y," which is the advertised (base) bandwidth of the AP 310. In one embodiment, during this association, the Station 305 provides an indication of its maximum-supported bandwidth. Throughout normal operations, as indicated by arrow 320, the AP 310 and Station 305 can then exchange data using the original bandwidth Y.

In the illustrated embodiment, at arrow 325, the AP 310 confirms that the uplink channel (and/or one or more adjacent channels) appears to be clear for some bandwidth "X." In an embodiment, the bandwidth X is an expanded bandwidth that is greater than and extends beyond the bandwidth Y. In some embodiments, the AP 310 makes this determination by monitoring the currently-used bandwidth Y, and/or the adjacent channels or portions of the wireless spectrum to the currently-used channel. In one embodiment, the AP 310 generates or determines an air quality index (AQI) for the expanded bandwidth X. In one embodiment, the AQI is determined via the neighbor discovery packets that the APs in the WLAN transmit and receive. For example, by momentarily switching the operating channel to the target channel, the system can determine the quality of the target channel. Each AP may then share this data with the central controller. In at least one embodiment, the AP 310 can query neighboring APs in order to determine whether they are currently using the other portions of the spectrum.

The AP 310 may monitor the channel(s) for some pre-defined period of time (e.g., on the order of seconds) in order to determine whether the expanded uplink is clear. In one embodiment, if the expanded bandwidth is clear, the AP 310 transmits a request to one or more Stations 305 (indicated by arrow 330). This request asks the Station 305 to return channel quality metrics for the specified bandwidth (X) from the perspective of the Station 305. In some embodiments, the Stations 305 may collect such metrics in parallel with the AP 310 collecting them. This may allow them to respond more rapidly to the request.

For example, the Station 305 may collect such metrics routinely, such that it can respond to requests from the AP 310 whenever needed. In another embodiment, when the AP 310 begins collecting statistics, it may instruct the Station(s) 305 to do so as well (e.g., before confirming that the uplink is clear).

In some embodiments, the AP 310 transmits the condition request (arrow 330) only to a subset of the Stations 305 that are capable of utilizing the determined expanded bandwidth X. For example, by referring to the indications provided when each Station 305 associated with the AP 310, the AP 310 can identify the Station(s) 305 that are capable of utilizing the bandwidth, if it is determined to be clear.

As indicated by arrow 335, each Station 305 then returns a response indicating the wireless channel quality for the indicated expanded bandwidth X, as seen from the perspective of the Station 305. In one embodiment, the AP 310 waits until each queried Station 305 (or some predefined number or percentage thereof) responds. In another embodiment, the AP 310 waits a predefined period of time before proceeding. In embodiments, the AP 310 can exclude any Stations 305 that did not respond to the request.

Based on the responses, the AP 310 can determine whether the downlink is clear (indicated by arrow 340). Collectively with the metrics determined by the AP 310, therefore, the AP 310 can determine whether the overall expanded channel is clear and free to use. In some embodiments, this determination is made based on comparing the metrics to predefined criteria (e.g., a minimum air quality score, a maximum noise floor, and the like). In some embodiments, in addition to determining whether the channel is clear, the AP 310 determines a time period (e.g., ten seconds) during which the expanded bandwidth is expected to be usable/available.

In at least one embodiment, the determination as to whether the expanded bandwidth is available (and/or the time it is available) is made based on a per-station basis. That is, the AP 310 may determine that the expanded bandwidth is available/usable to one Station 305 based on its metrics (e.g., because the air quality is clear for the Station 305), while it is not available or usable by another (e.g., because the channel contention or other metric determined by the other station meets or fails to meet predefined criteria).

As indicated by arrow 345, the AP 310 can then transmit trigger frames to each available Station 305 to initiate communications at the expanded bandwidth. That is, the AP 310 transmits a trigger to one or more Stations 305 that participated in the condition poll (illustrated by arrows 330 and 335). This trigger includes an indication of the expanded bandwidth that is to be used, as well as the time during which the bandwidth is to be used. In some embodiments, the AP 310 can transmit the trigger frame to less than all of the polled Stations 305 (e.g., if one or more of the Stations 305 indicated that channel quality is low).

In at least one embodiment, the AP 310 may transmit different triggers to each Station 305, allowing each Station 305 to use the expanded capacity in different manners. For example, the AP 310 may use a different timeout value T for each Station 305, based in part on the metrics provided by each.

As indicated by arrow 355, in one embodiment, the designated time begins running as soon as this trigger is transmitted. In some embodiments, rather than a period of time, the AP 310 may indicate a timeout time. That is, in addition to or rather than indicating that the expanded bandwidth will be available for ten seconds, the AP 310 may indicate that it is available until a particular time (e.g., 3:26:10).

At arrow 350, the Stations 305 confirm that they are able and ready to participate in the expanded burst bandwidth. Subsequently, as indicated by the arrow 360, the Stations 305 begin transmitting and receiving data to and from the AP 310 using the expanded bandwidth Y. This communication at the expanded capacity can continue until one or more predefined terminating criteria are satisfied.

In some embodiments, one such criteria includes the expiration of the determined time T. In at least one embodiment, if the channel quality metrics are still satisfactory, however, the AP 310 may continue to provide expanded bandwidth communications until they degrade, even if the time T has expired. In an embodiment, if the channel quality degrades during the time period (e.g., indicated by a number or percentage of lost packets, or other quality metrics), the AP 310 may prematurely transmit an end trigger. This end trigger is illustrated by arrow 365.

In one embodiment, the end trigger indicates the bandwidth that the AP 310 will utilize to transmit subsequent data (e.g., the base bandwidth Y). In response, each Station 305 confirms that it will use the indicated bandwidth Y (indicated by arrow 370). The AP 310 and Station 305 then return to exchanging data using the old base bandwidth Y (indicated by arrow 375).

In embodiments, this workflow 300 may be performed periodically or continuously in order to provide bursts of higher bandwidth when possible.

Figure 4:
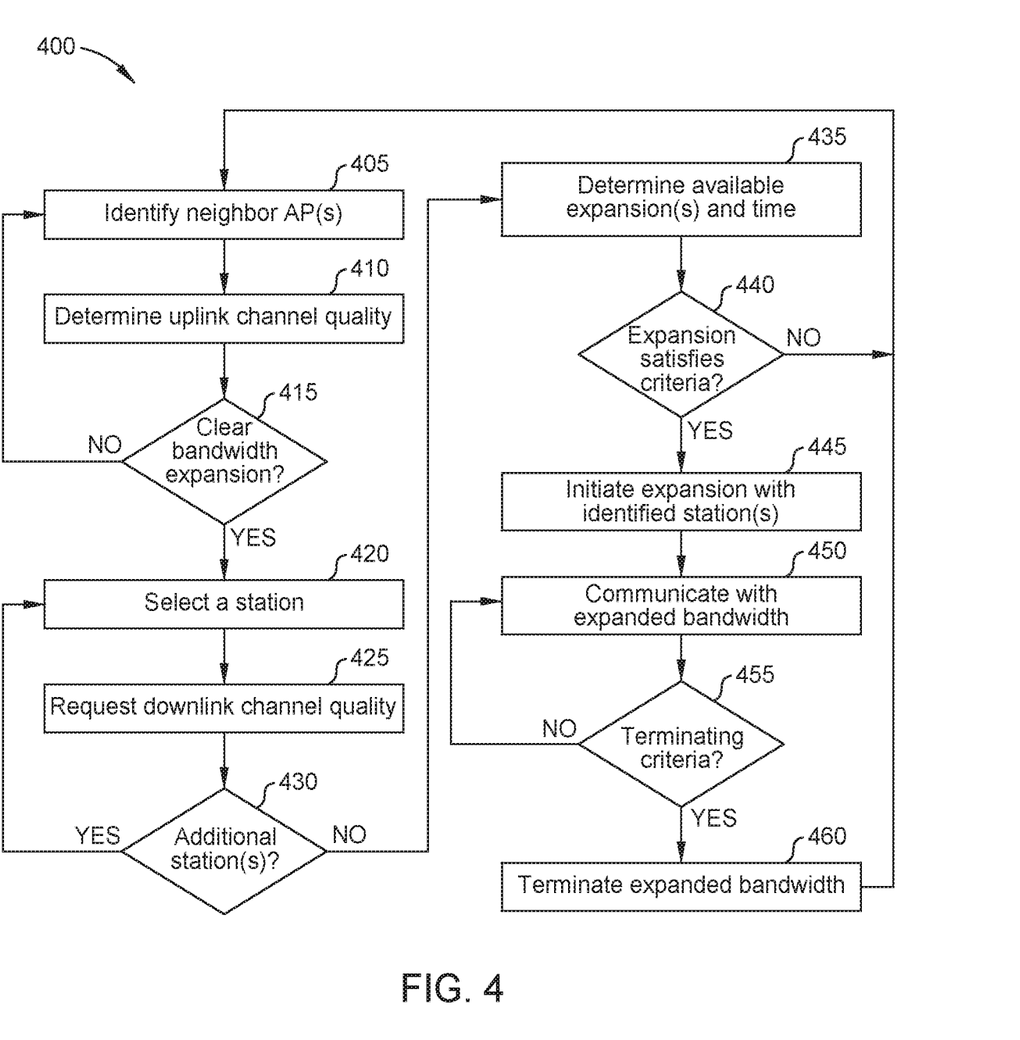
FIG. 4 is a flow diagram illustrating a method for providing dynamic bandwidth expansion, according to some embodiments disclosed herein.

FIG. 4 is a flow diagram illustrating a method 400 for providing dynamic bandwidth expansion, according to some embodiments disclosed herein. The method 400 begins at block 405, where an AP identifies one or more neighbor APs. In one embodiment, the AP can utilize data from these neighbor APs in order to determine whether the adjacent channel(s) are clear for expanded bandwidth communications. At block 410, based on metrics collected by the AP and/or metrics from the neighbor APs, the AP can determine the quality of the channel from the uplink perspective.

In embodiments, the quality of the (potential) expanded bandwidth can be determined based on a wide variety of factors, including the air quality index, the noise floor, the signal-to-noise ratio, whether any neighbor APs are currently using the channel, and the like. At block 415, the AP determines whether the channel is clear for bandwidth expansion (from the uplink perspective). If not, the method 400 returns to block 405, and the AP does not initiate expanded bandwidth communications.

If at least one portion of expanded bandwidth appears available for at least some predefined minimum period of time, the method 400 continues to block 420 where the AP selects one of the stations that is capable of supporting the determined expanded bandwidth. At block 425, the AP requests an indication of the downlink channel quality at the station, with respect to the determined expanded bandwidth. The method 400 then continues to block 430.

At block 430, the AP determines whether there is at least one additional station that is capable of supporting the expanded bandwidth but that has not yet been polled for quality metrics. If so, the method 400 returns to block 420. If all capable stations have been queried, the method 400 continues to block 435.

At block 435, the AP determines the available expansion(s), as well as the time the expanded space is expected to be available. In some embodiments, this is based on the current and immediately-prior data collected by the AP and/or the stations. In one embodiment, this determination is made based in part on historical data. In at least one embodiment, the AP makes this determination using one or more machine learning models.

For example, the AP may compare the current metrics to previously-collected metrics in order to identify prior intervals with similar quality metrics. By determining how long these prior windows of similarly clear bandwidth persisted, the AP can estimate how long the current window will last.

The method 400 then continues to block 440, where the AP determines whether the determined expansion satisfies one or more predefined criteria. In embodiments, this may include determining whether the amount of the expansion (e.g., from 40 megahertz to 80 megahertz) satisfies predefined minimum expansion, and/or whether the predicted stability time exceeds a predefined minimum time. In at least one embodiment, the AP determines whether the expanded bandwidth will be available for a predefined minimum number of stations.

If the criteria are not satisfied, the method 400 returns to block 405 and the method 400 begins anew. If the criteria are satisfied, the method 400 continues to block 445, where the AP initiates the expanded bandwidth with the identified stations that are capable of supporting the expansion and that reported quality metrics indicating the airspace is clear, from the perspective of the station. In one embodiment, this includes transmitting a trigger frame to the identified stations indicating the new bandwidth and the time during which the new bandwidth will be used.

At block 450, the AP then communicates with the identified station(s) using the expanded bandwidth. In some embodiments, the AP continues to communicate with other stations using the prior base bandwidth. That is, the AP may communicate with some stations using the original (advertised) bandwidth, while simultaneously communicating with other stations using the new (expanded) bandwidth. This allows the AP to provide significantly increased throughput without interrupting communications for the other stations.

The method 400 then continues to block 455, where the AP determines whether the terminating criteria are satisfied. As discussed above, this can include, for example, expiration of the predicted clear time, determining that the expanded channel is no longer sufficiently clear, and the like. If the criteria are not satisfied (e.g., the expanded bandwidth is still clear), the method 400 returns to block 450. If the criteria are satisfied, however, the method 400 proceeds to block 460, where the AP terminates the expanded bandwidth. This may include, for example, instructing the stations to communicate using the original (advertised) base bandwidth. The method 400 then returns to block 405 to restart.

Figure 5:
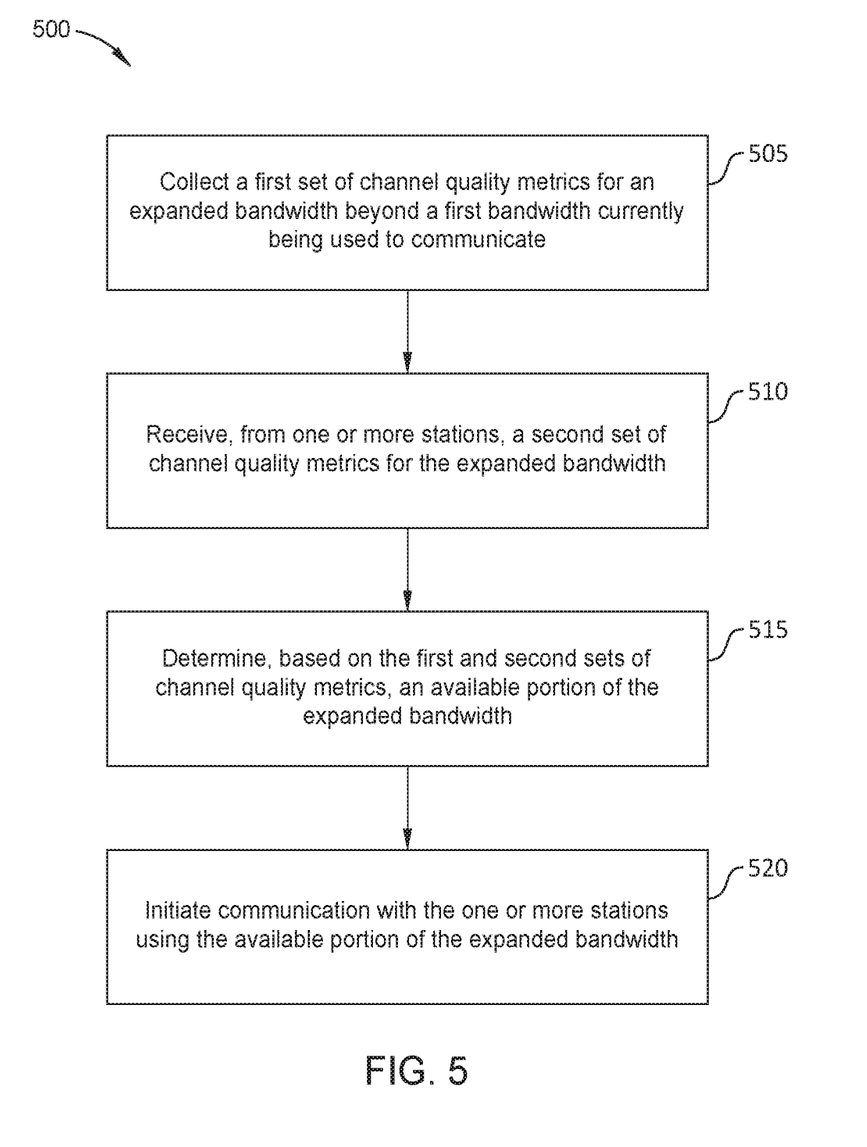
FIG. 5 is a flow diagram illustrating a method for providing dynamic bandwidth expansion, according to some embodiments disclosed herein.

FIG. 5 is a flow diagram illustrating a method 500 for providing dynamic bandwidth expansion, according to some embodiments disclosed herein. The method 500 begins at block 505, where an AP collects a first set of channel quality metrics for an expanded bandwidth beyond a first bandwidth currently being used to communicate. At block 510, the AP receives, from one or more stations, a second set of channel quality metrics for the expanded bandwidth. The method 500 then continues to block 515, where the AP determines, based on the first and second sets of channel quality metrics, an available portion of the expanded bandwidth. Further, at block 520, the AP initiates communication with the one or more stations using the available portion of the expanded bandwidth.

Figure 6:
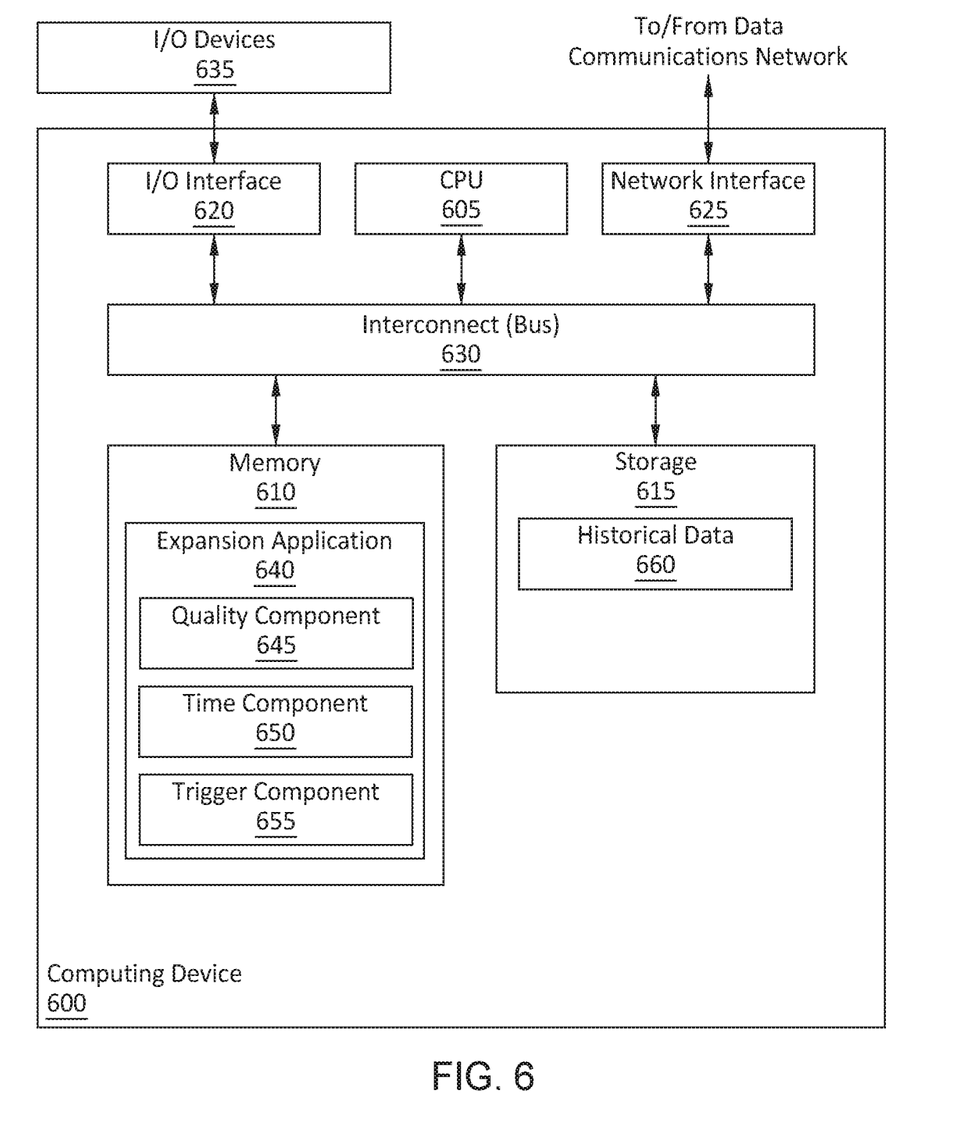
FIG. 6 is a block diagram illustrating an access point configured to provide dynamic bandwidth expansion, according to some embodiments disclosed herein.

FIG. 6 is a block diagram illustrating an access point configured to provide dynamic bandwidth expansion, according to some embodiments disclosed herein. In one embodiment, the Computing Device 600 corresponds to an access point in a wireless deployment. Although depicted as a physical device, in embodiments, the Computing Device 600 may be implemented as a virtual device or service, or across a number of devices (e.g., in a cloud environment). As illustrated, the Computing Device 600 includes a Processor 605, Memory 610, Storage 615, I/O Interface 620, and a Network Interface 625. In the illustrated embodiment, the Processor 605 retrieves and executes programming instructions stored in Memory 610, as well as stores and retrieves application data residing in Storage 615. The Processor 605 is generally representative of a single CPU, a GPU, a CPU and a GPU, multiple CPUs, multiple GPUs, a single CPU or GPU having multiple processing cores, and the like. The Memory 610 is generally included to be representative of a random access memory. Storage 615 may be any combination of memory or storage components, including (but not limited to) disk drives, flash-based storage devices, and the like, and may include fixed storage devices, removable storage devices or a combination both, such as fixed disk drives, removable memory cards, caches, optical storage, network attached storage (NAS), or storage area networks (SAN).

In some embodiments, I/O Devices 635 (such as a mouse, a keyboard, a monitor, a touchscreen, etc.) are connected via the I/O Interface(s) 620. Further, via the Network Interface 625, the Computing Device 600 can be communicatively coupled with one or more other devices and components (directly or indirectly) such as stations, network controllers, and the like.

In the illustrated embodiment, the Storage 615 includes Historical Data 660. Although depicted as residing in Storage 615, the Historical Data 660 may be stored in any suitable location. In embodiments, the Historical Data 660 generally include historical information relating to channel quality, as observed by one or more APs and one or more stations, over time. In some embodiments, the Historical Data 660 includes intervals or windows of time when one or more APs were utilizing expanded bandwidth. The Historical Data 660 may indicate how long the window was open (e.g., for how long the channel was clear), when the window occurred (e.g., the time of day), the number of involved stations, the magnitude of the expansion, and the like.

In embodiments, by utilizing the Historical Data 660, the Computing Device 600 can learn to better analyze current data and generate better predictions about the scope of available expanded bandwidth (including the magnitude and the time).

As illustrated, the Memory 610 includes an Expansion Application 640. Although depicted as software residing in Memory 610, in embodiments, the functionality of the Expansion Application 640 may be implemented using hardware, software, or a combination of hardware and software. As illustrated, the Expansion Application 640 includes a Quality Component 645, a Time Component 650, and a Trigger Component 655. Although depicted as discrete components for conceptual clarity, in embodiments, the operations of the Quality Component 645, Time Component 650, and Trigger Component 655 may be combined or distributed across any number of components.

In an embodiment, the Quality Component 645 can collect and analyze channel metrics in order to generate quality scores for the channel (and for adjacent channels) in order to determine available portions of expanded bandwidth. This may include collecting statistics from one or more APs and/or from one or more stations. In some embodiments, the Quality Component 645 compares the currently-collected metrics to the Historical Data 660 to determine which, if any, portions of the spectrum may be available for expanded bandwidth communication.

In the illustrated embodiment, the Time Component 650 generally evaluates the metrics collected by the Quality Component 645 in order to predict how long the expanded bandwidth will be available for. For example, based on how stable the metrics are over the immediate interval (e.g., the last ten seconds), the Time Component 650 may predict how much longer they will remain stable. In some embodiments, the Time Component 650 can similarly compare the current metrics to the Historical Data 660 to estimate how long the current window of stability will remain.

In an embodiment, the Trigger Component 655 initiates the expanded bandwidth communication with the capable stations. In some embodiments, the Trigger Component 655 also monitors the communication to identify any terminating criteria. This may include, for example, reviewing updated metrics collected by the Quality Component 645, checking that the timer has not expired, and the like. When the criteria are satisfied, in an embodiment, the Trigger Component 655 terminates the expanded bandwidth communication and the stations revert to the advertised base bandwidth.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   collecting, by an access point (AP) communicating using a first bandwidth, a first set of channel quality metrics, for an expanded bandwidth beyond the first bandwidth, with respect to uplink communications;
   receiving, from one or more stations, a second set of channel quality metrics, for the expanded bandwidth, with respect to downlink communications;
   determining, based on the first and second sets of channel quality metrics, an available portion of the expanded bandwidth, with respect to both uplink and downlink communications; and
   initiating communication with the one or more stations using the available portion of the expanded bandwidth.

2. The method of claim 1, the method further comprising transmitting, to the one or more stations, a request for the second set of channel quality metrics.

3. The method of claim 1, determining the available portion of the expanded bandwidth comprises:
   determining that the available portion of the expanded bandwidth is available to a first station of the one or more stations; and determining that the available portion of the expanded bandwidth is not available to a second station of the one or more stations.

4. The method of claim 3, wherein initiating communication with the one or more stations using the available portion of the expanded bandwidth comprises:
transmitting an indication of the available portion of the expanded bandwidth to the first station; and
refraining from transmitting an indication of the available portion of the expanded bandwidth to the seconds station.

5. The method of claim 1, the method further comprising:
determining that the available portion of the expanded bandwidth is no longer available;
terminating communication with the one or more stations using the available portion of the expanded bandwidth; and
re-initiating communication with the one or more stations using the first bandwidth.

6. The method of claim 5, the method further comprising:
determining, based on the first and second sets of channel quality metrics, a period of time when the available portion of the expanded bandwidth will be available, wherein determining that the available portion of the expanded bandwidth is no longer available comprises determining that the period of time has elapsed.

7. The method of claim 5, wherein determining that the available portion of the expanded bandwidth is no longer available comprises:
collecting a third set of channel quality metrics for the available portion of the expanded bandwidth.

8. A non-transitory computer-readable medium containing computer program code that, when executed by operation of one or more computer processors, performs an operation comprising:
collecting, by an access point (AP) communicating using a first bandwidth, a first set of channel quality metrics, for an expanded bandwidth beyond the first bandwidth, with respect to uplink communications;
receiving, from one or more stations, a second set of channel quality metrics, for the expanded bandwidth, with respect to downlink communications;
determining, based on the first and second sets of channel quality metrics, an available portion of the expanded bandwidth, with respect to both uplink and downlink communications; and
initiating communication with the one or more stations using the available portion of the expanded bandwidth.

9. The computer-readable medium of claim 8, the operation further comprising transmitting, to the one or more stations, a request for the second set of channel quality metrics.

10. The computer-readable medium of claim 8, determining the available portion of the expanded bandwidth comprises:
determining that the available portion of the expanded bandwidth is available to a first station of the one or more stations; and
determining that the available portion of the expanded bandwidth is not available to a second station of the one or more stations.

11. The computer-readable medium of claim 10, wherein initiating communication with the one or more stations using the available portion of the expanded bandwidth comprises:
transmitting an indication of the available portion of the expanded bandwidth to the first station; and
refraining from transmitting an indication of the available portion of the expanded bandwidth to the seconds station.

12. The computer-readable medium of claim 8, the operation further comprising:
determining that the available portion of the expanded bandwidth is no longer available;
terminating communication with the one or more stations using the available portion of the expanded bandwidth; and
re-initiating communication with the one or more stations using the first bandwidth.

13. The computer-readable medium of claim 12, the operation further comprising:
determining, based on the first and second sets of channel quality metrics, a period of time when the available portion of the expanded bandwidth will be available, wherein determining that the available portion of the expanded bandwidth is no longer available comprises determining that the period of time has elapsed.

14. The computer-readable medium of claim 12, wherein determining that the available portion of the expanded bandwidth is no longer available comprises:
collecting a third set of channel quality metrics for the available portion of the expanded bandwidth.

15. A system, comprising:
one or more computer processors; and
a memory containing a program which when executed by the one or more computer processors performs an operation, the operation comprising:
collecting, by an access point (AP) communicating using a first bandwidth, a first set of channel quality metrics, for an expanded bandwidth beyond the first bandwidth, with respect to uplink communications;
receiving, from one or more stations, a second set of channel quality metrics, for the expanded bandwidth, with respect to downlink communications;
determining, based on the first and second sets of channel quality metrics, an available portion of the expanded bandwidth, with respect to both uplink and downlink communications; and
initiating communication with the one or more stations using the available portion of the expanded bandwidth.

16. The system of claim 15, determining the available portion of the expanded bandwidth comprises:
determining that the available portion of the expanded bandwidth is available to a first station of the one or more stations; and
determining that the available portion of the expanded bandwidth is not available to a second station of the one or more stations.

17. The system of claim 16, wherein initiating communication with the one or more stations using the available portion of the expanded bandwidth comprises:
transmitting an indication of the available portion of the expanded bandwidth to the first station; and
refraining from transmitting an indication of the available portion of the expanded bandwidth to the seconds station.

18. The system of claim 15, the operation further comprising:
determining that the available portion of the expanded bandwidth is no longer available;
terminating communication with the one or more stations using the available portion of the expanded bandwidth; and re-initiating communication with the one or more stations using the first bandwidth.

19. The system of claim 18, the operation further comprising:
    determining, based on the first and second sets of channel quality metrics, a period of time when the available portion of the expanded bandwidth will be available, wherein determining that the available portion of the expanded bandwidth is no longer available comprises determining that the period of time has elapsed.

20. The system of claim 18, wherein determining that the available portion of the expanded bandwidth is no longer available comprises:
    collecting a third set of channel quality metrics for the available portion of the expanded bandwidth.

* * * * *